United States Patent
Hessdörfer

(10) Patent No.: US 9,751,436 B2
(45) Date of Patent: Sep. 5, 2017

(54) ARM REST HAVING A CRASH PROTECTION

(71) Applicant: Volkswagen Aktiengesellschaft, Wolfsburg (DE)

(72) Inventor: Thomas Hessdörfer, Karlstadt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 71 days.

(21) Appl. No.: 14/829,475

(22) Filed: Aug. 18, 2015

(65) Prior Publication Data

US 2016/0052428 A1  Feb. 25, 2016

(30) Foreign Application Priority Data

Aug. 20, 2014  (DE) .......... 10 2014 111 923

(51) Int. Cl.
  *B60N 2/46* (2006.01)
  *B60N 2/42* (2006.01)

(52) U.S. Cl.
  CPC ........ *B60N 2/4606* (2013.01); *B60N 2/43* (2013.01); *B60N 2/4633* (2013.01)

(58) Field of Classification Search
  CPC ....... B60N 2/4606; B60N 2/4633; B60N 2/43
  USPC .... 297/216.1, 411.2, 411.32, 411.35, 411.38
  See application file for complete search history.

(56) References Cited

U.S. PATENT DOCUMENTS

| | | | | |
|---|---|---|---|---|
| 4,101,093 A | * | 7/1978 | Colasanti | G01P 15/032 242/384.5 |
| 4,164,337 A | * | 8/1979 | Blom | B60R 22/26 242/384.4 |
| 4,166,592 A | * | 9/1979 | Barcus | B60R 22/40 242/384.5 |
| 4,181,326 A | * | 1/1980 | Hollowell | B60R 22/41 242/384.1 |
| 4,225,178 A | * | 9/1980 | Takada | B60N 2/4221 248/561 |
| 4,310,196 A | * | 1/1982 | Vogel | B60N 2/242 297/411.32 |
| 4,318,569 A | * | 3/1982 | Bilenchi | B60N 2/433 297/378.11 |
| 4,343,444 A | * | 8/1982 | Francis | B60R 22/40 242/384.4 |

(Continued)

FOREIGN PATENT DOCUMENTS

| | | |
|---|---|---|
| DE | 20101916 U1 | 6/2002 |
| JP | 06141949 A * | 5/1994 |

*Primary Examiner* — Milton Nelson, Jr.

(74) *Attorney, Agent, or Firm* — Muncy, Geissler, Olds & Lowe, P.C.

(57) ABSTRACT

An arm rest for a vehicle seat includes a console part and an arm support mounted at the console part so as to be swivelable about a swivel axis between a use position and a rest position. Latching teeth fixedly arranged at the console part or at the arm support engage a latching engagement member mounted at the arm support or at the console part so as to be shiftable. An inertia member mounted so as to be shiftable between at least one release position and at least one blocked position. The inertia member, in the blocked position, prevents unlatching of the latching engagement member from a latched status, wherein inertia member is shifted from the release position into the blocked position upon an acceleration of the arm rest due to the inertia of the inertia member.

17 Claims, 3 Drawing Sheets

(56) References Cited

U.S. PATENT DOCUMENTS

| | | | | |
|---|---|---|---|---|
| 4,621,864 A * | 11/1986 | Hill | B60N 2/242 | 297/115 |
| 4,834,425 A * | 5/1989 | Kawai | B60R 22/06 | 280/804 |
| 5,058,240 A * | 10/1991 | Barda | B60N 2/433 | 16/325 |
| 5,211,445 A * | 5/1993 | Husted | B60N 2/20 | 16/335 |
| 5,476,307 A * | 12/1995 | Whalen | B60N 2/4606 | 297/378.11 |
| 5,597,209 A * | 1/1997 | Bart | B60N 2/4633 | 297/411.32 |
| 5,622,383 A * | 4/1997 | Kielwein | B60R 22/40 | 200/61.45 R |
| 5,658,043 A * | 8/1997 | Davidson | B60N 2/4606 | 297/113 |
| 5,690,386 A * | 11/1997 | Chabanne | B60N 2/688 | 297/367 R |
| 5,702,157 A * | 12/1997 | Hurite | B60N 2/4633 | 297/411.32 |
| 5,733,010 A * | 3/1998 | Lewis | A61G 15/12 | 297/115 |
| 6,375,265 B1 * | 4/2002 | Hubner | B60N 2/4606 | 297/216.1 |
| 6,474,586 B1 * | 11/2002 | Kapanka | B60R 22/28 | 242/379.1 |
| 6,533,353 B2 * | 3/2003 | Johnston | A61G 5/14 | 297/330 |
| 6,578,419 B1 * | 6/2003 | Murayama | B60R 22/40 | 242/384.6 |
| 6,742,845 B2 * | 6/2004 | Nock | B60N 2/2352 | 297/378.11 |
| 6,789,849 B2 * | 9/2004 | Gray | B60N 2/206 | 297/367 R |
| 6,827,403 B2 * | 12/2004 | Paasche | B60N 2/235 | 297/366 |
| 6,860,560 B2 * | 3/2005 | Chiu | B60N 2/2352 | 297/366 |
| 7,100,242 B2 * | 9/2006 | Maierholzner | B60N 2/4435 | 16/319 |
| 7,284,799 B2 * | 10/2007 | Chung | B60N 2/4633 | 297/411.32 |
| 7,300,013 B2 * | 11/2007 | Morgan | B29C 45/14065 | 242/384.4 |
| 7,377,464 B2 * | 5/2008 | Morgan | B60R 22/40 | 242/384.5 |
| 7,637,536 B2 * | 12/2009 | Delventhal | B60R 22/36 | 242/383.2 |
| 9,016,793 B2 * | 4/2015 | Roeglin | B60N 2/4606 | 297/411.32 |
| 2002/0089224 A1 * | 7/2002 | Bruck | B60N 2/2352 | 297/378.11 |
| 2002/0089225 A1 * | 7/2002 | Bruck | B60N 2/2352 | 297/378.11 |
| 2002/0170381 A1 * | 11/2002 | Hansel | B60N 2/2352 | 74/577 M |
| 2007/0007811 A1 * | 1/2007 | Chung | B60N 2/4633 | 297/411.38 |
| 2007/0029858 A1 * | 2/2007 | Grable | B60N 2/20 | 297/378.1 |
| 2010/0096897 A1 * | 4/2010 | Kienke | B60N 2/2352 | 297/367 R |
| 2013/0076096 A1 * | 3/2013 | Pacolt | B60N 2/4633 | 297/411.38 |
| 2014/0175850 A1 * | 6/2014 | Roeglin | B60N 2/4606 | 297/411.38 |

* cited by examiner

ARM REST HAVING A CRASH PROTECTION

CROSS-REFERENCE TO RELATED APPLICATIONS

This application claims priority to German Patent Application No. 10 2014 111 923.1 filed on Aug. 20, 2014, which is fully incorporated herein by reference.

STATEMENT REGARDING FEDERALLY SPONSORED RESEARCH OR DEVELOPMENT

Not applicable.

FIELD OF THE INVENTION

The invention relates to an arm rest for being arranged at a vehicle seat, having a console part as well as an arm support that is mounted at the console part so as to be swivelable.

BACKGROUND OF THE INVENTION

Different embodiments of swivelable arm rests are known from the state of the art. The subject-matter of the present application are those arm rests which can be swiveled up from a use position, into which said arm rests have been swiveled down, into a rest position, into which said arm rests have been swiveled up, without actuating an actuating member, and which can equally be swiveled back from the upper rest position to the use position. Moreover, such arm rests from the state of the art can be latched in several intermediate positions for adapting the ideal support height of the arm rest. For this purpose, the known arm rests include a latching mechanism, which allows for swiveling the arm rests up without hindrance, but which prevents swiveling down of the arm rests out of a latched position. In contrast to that, swiveling down back into the lower use position is realized in that the arm rests are firstly swiveled up until they reach the rest position, whereby the latching function is deactivated with the help of an unlocking mechanism, such that swiveling the arm rests down into the use position becomes possible.

As a rule, said embodiment having a latching mechanism and an unlocking mechanism constitutes a suitable solution for realizing a swivelable arm rest. As a general rule, it can be said that it does not happen that the arm support is swiveled up inadvertently. However, in particular in crash scenarios, cases are conceivable in which, for example due to the vehicle somersaulting subsequently, the arm support is inadvertently shifted from the use position in the direction of the rest position relative to the console part. Even though there is, as a general rule, no risk to such a scenario, circumstances are conceivable in rare cases where heavy items, for example, fall out of a storage compartment that is situated beneath the arm support and down into the passenger compartment while the vehicle is somersaulting, injuring the persons sitting in the passenger compartment. Therefore, it is desirable that the arm support cannot be shifted out of the use position in the case of a crash.

For this purpose, it is known in the state of the art to employ, instead of an arm support that can be swiveled as usual, an embodiment that is comparable to a swivelable lid, which is retained in the closed position with the help of a locking means. Correspondingly, before the arm support in the type of a locked lid can be swiveled up, it is firstly required to actuate an actuating mechanism for unlocking the locking means. This, on the one hand, involves the disadvantage that swiveling up is not directly possible and, on the other hand, that a mechanism for actuating and locking is required. The fact that actuation is, as a general rule, needed at the face end of the arm rest is in particular disadvantageous, with this being especially the region where the least installation space is available.

SUMMARY OF THE INVENTION

It is therefore the object of the present invention to prevent inadvertent swiveling up of the arm support in the case of a crash, wherein the disadvantages of the embodiments that are usually suitable for this purpose are avoided at the same time. The set object is attained by an embodiment described herein.

The generic arm rest firstly serves for being arranged at a vehicle seat. Here, it is irrelevant whether the arm rest is directly attached at the vehicle seat or at another point in the vehicle, and it is equally irrelevant whether the arm rest is used as a center arm rest between two seats or as a side arm rest for only one vehicle seat. For the present consideration, it is essential that the arm rest comprises a console part that can be attached in the vehicle, wherein an arm support that is mounted so as to be swivelable about a swivel axis is arranged at the console part. Here, the arm support can at least be swiveled between a use position, into which said arm support has been swiveled down, and a rest position, into which said arm support has been swiveled up.

Moreover, the arm rest, for realizing at least one intermediate position of the arm support between the use position, into which said arm support has been swiveled down, and the rest position, into which said arm support has been swiveled up, comprises latching teeth as well as a latching engagement means interacting with the latching teeth. Here, the latching teeth are either fixedly connected to the console part or fixedly connected to the arm support. Correspondingly, when the latching teeth are arranged at the console part, the latching engagement means is mounted at the arm support, and when the latching teeth are arranged at the arm support, the latching engagement means is mounted at the console part. The latching engagement means, interacting with the latching teeth, causes the latching engagement means to engage the latching teeth in at least one intermediate position when the arm support is being swiveled up, out of the use position, such that swiveling down of the arm support, out of the intermediate position in the direction of the lower use position, is prevented. In contrast to that, the arm support can unabatedly be swiveled out of the intermediate position in the direction of the rest position. Here, by swiveling the arm support out of the intermediate position, the latching engagement means is lifted out of the latching teeth in an automated fashion and is brought out of engagement.

Complete swiveling down from the rest position into the use position is generically realized by employing an unlocking mechanism, wherein the same, at least when the rest position is reached, influences the latching engagement means and/or the latching teeth to that respect that the latching engagement means cannot engage the latching teeth any more until the use position has been reached. Said unlocked status that has been produced in this manner is again deactivated when the use position is reached, such that, when the arm support is subsequently swiveled up in the direction of the rest position, the latching engagement means can again be latched in the latching teeth. For realizing the unlocking mechanism, the persons skilled in the art have different known solutions at their disposal, such that further explanations in that respect are omitted.

Generically, swiveling the arm support up from the use position into the rest position without hindrance and swiveling the arm support down from the rest position into the use position without hindrance is thus made possible, without an actuation of any kind being required. An intermediate position is equally made possible, such that the arm support can be retained in a status that deviates from the lower use position.

In accordance with the invention, instead of using a locking mechanism with an actuating member, an inertia member is now employed, which can be shifted by way of inertia and which influences the shiftability of the latching engagement means. Here, the inertia member can be shifted between at least one release position and at least one blocked position. If the inertia member is situated in the release position, unlatching of the latching engagement means without hindrance is possible, such that the arm support can be swiveled up in the usual manner. In contrast to that, when the inertia member is in the status of the blocked position, unlatching of the latching engagement means from the latched status is prevented, such that, starting from the latched position, when the latching engagement means engages with the latching teeth, swiveling of the arm support up into the rest position is now prevented.

When configuring the inertia member as well as mounting it, it has to be taken into account that the inertia member, in the state of rest, without any acceleration, firstly has to be situated in the release position. It is neither required nor normally intended that the inertia member is shifted already upon minor accelerations or vibrations.

In contrast to that, it is envisaged in accordance with the invention that upon an acceleration of the arm rest as a result of a crash, the inertia member is shifted relative to the console part or relative to the arm support. Correspondingly, the accelerations that have to be expected in a crash reliably have to lead to the inertia member being shifted. In that respect, it is irrelevant that, upon an acceleration of the vehicle, if a certain acceleration value is exceeded and there is no crash, the inertia member is shifted into the blocked position and swiveling up of the arm support is thus prevented.

For shifting the inertia member upon an acceleration of the arm rest, it is envisaged that the mass inertia of the inertia member acting in its center of gravity, taking into account the mounting of the inertia member upon an acceleration of the arm rest, firstly leads to an unchanged movement pattern of the center of gravity. A shift of the inertia member relative to its mounting at the console part or at the arm support results therefrom. The relative location of the inertia member that has changed due to the acceleration leads to a changeover from the release position into the blocked position.

By way of this embodiment, the blocked state of the latching means can in a particularly comfortable manner be realized with the inventive arm rest in the case of a crash due to the acceleration of the vehicle setting in this situation, such that undesired swiveling up of the arm support out of the intermediate position is prevented.

Here, it is particularly advantageous if the latching engagement means engages the latching teeth both in the intermediate position and in the lower use position, a shift of the arm support in the case of a crash thus reliably being prevented both in the lower use position and in the intermediate position.

Moreover, in terms of comfort when shifting the arm support, it is particularly advantageous if at least two, particularly advantageously multiple intermediate positions can be realized, in which the latching engagement means is able to engage the latching teeth.

When contemplating the acceleration of the arm rest for shifting the inertia member from the release position into the blocked position, it is, for one thing, advantageous if said shift is effected upon an acceleration in the direction of the swivel axis of the arm support, i.e. upon an accelerated transverse movement of the vehicle. And for another, it is, however, particularly advantageous if—in the case of typical crash scenarios—the shift into the blocked position is effected upon an acceleration in the direction of a longitudinal axis of an arm support that is situated in the use position or intermediate position. Thus, this corresponds to the case of a crash when the vehicle runs into an obstacle or to the case of a crash when a vehicle runs into the contemplated vehicle from behind.

The shift from the blocked position into the release position can be effected in different manners, wherein it is particularly advantageous if the shift from the blocked position into the release position is effected in an automated fashion, without an intervention of the user being required. Here, it is, for one thing, possible to mount the inertia member in such a manner that, when there is no acceleration, said inertia member is shifted from the blocked position into the release position in an automated fashion, due to the gravity of the inertia member. And for another, it is likewise or alternatively equally possible to restore the inertia member from the blocked position into the release position with the help of elastically acting restoring forces, wherein at least one spring member is particularly advantageously employed to that end. In this second embodiment, reliable restoring is achieved for one thing, and for another, greater freedom regarding the mounting of the inertia member is additionally possible, taking into account the center of gravity thereof.

For realizing the release position and the blocked position, it is moreover advantageous if the latching engagement means includes a bearing surface, which, in the release position, is able to immerse into a clearance of the inertia member. Swiveling up the arm support with shifting of the latching engagement means setting in simultaneously upon unlatching from the latching teeth leads to a relocation of the bearing surface which protrudes from the latching engagement means, and which can readily be moved, in the release position, into a clearance of the inertia member.

In contrast to that, at least one abutment surface is provided at the inertia member, on which, in the blocked position, the bearing surface is able to abut. If the inertia member has been shifted into the blocked position due to the acceleration of the arm rest, a shift of the latching engagement means, due to the arm rest being swiveled up, with the attempt to unlatch from the latching teeth, leads to the bearing surface abutting upon the abutment surface. Here, it has to be ensured that the latching engagement means cannot completely unlatch from the latching teeth. Thus, swiveling up of the arm support is at the same time prevented.

As a result, the blocked state of the arm support is thus realized in the case of a crash by way of a deadlock of the latching engagement means, wherein the inertia member being moved by way of the acceleration, with its abutment surface stopping the movement, is again employed for this purpose.

In an advantageous manner, in particular for protection against both usual crash scenarios—running into an obstacle as well as the situation when another vehicle coming from behind runs into a vehicle—, abutment surfaces are provided on both sides of the clearance. Thus, the inertia member can be shifted in two directions due to an acceleration of the arm rest, wherein in both cases, a changeover from the release position into the blocked position is effected. Alternatively, it is possible that the inertia member is embodied in such a manner that a clearance is formed within a surrounding abutment surface. This leads to the extended possibility of a shift into the blocked position, both upon an acceleration, for example in the longitudinal direction of the arm support, and additionally upon a transverse acceleration with respect to the arm support, i.e. in the direction of the swivel axis of the arm support.

Due to the acceleration values that sometimes change abruptly in the case of a crash, it is moreover advantageous for a reliable securing of the arm support if the bearing surface and/or the abutment surface are/is shaped in such a manner that the inertia member is prevented from being restored into the release position out of the blocked position when the arm support is lifted to some extent. This can, for one thing, be realized in that sufficient friction forces act between the bearing surface and the abutment surface, which prevent the inertia member from being restored. And for another, it would equally be conceivable to embody the bearing surface and/or the abutment surface with an inclined surface that is oriented against the movement into the release position.

Moreover, it is advantageous if the inertia member is prevented from swinging back and forth without hindrance. Nevertheless, it is necessary that the inertia member can change into the blocked position as freely as possible in the case of a crash. Therefore, it is advantageous if the inertia member is mounted in such a manner that the movement from the release position into the blocked position can be effected without any deceleration. By contrast, it is advantageous if the shift from the blocked position into the release position is effected in a decelerated fashion due to a counter-force. Here, it is, for example, possible to make a dampening member engage with the inertia member, which dampening member acts only on one side and decelerates the movement into the release position. Thus, the inertia member is prevented from swinging back and forth between the release position and the blocked position without hindrance.

The inertia member can be mounted in different manners, wherein the inertia member, in a first embodiment, is mounted on a swing axis so as to be swivelable. Alternatively to mounting the inertia member on a swivel axis, it is equally possible to mount the inertia member on a ball joint, such that the same is able to shift about a swing pivot.

Here, in a first embodiment it is in turn possible to arrange the center of gravity of the inertia member below the swing axis or below the swing pivot. For this purpose, only the corresponding mass distribution is required in the inertia member. Taking into account the release position and the blocked position, i.e. taking into account the clearance and the required abutment surface or surfaces, it may be advantageous if the inertia member is additionally equipped with a swing weight, which is situated below the swing axis or the swing pivot. At least it is possible in this embodiment example to carry out the restoration of the inertia member from the blocked position into the release position due to the gravity of the inertia member. Nevertheless, it may be advantageous if elastic restoring forces also act in this case from at least two, in particular from four sides at the inertia member, said restoring forces retaining the inertia member in the release position. Thus, it is ensured that the release position is given without any exterior influences and that swiveling the arm support up without hindrance when the latching engagement means is shifted is possible.

In an alternative embodiment, it is equally conceivable that the swing axis or the swing pivot is arranged so as to be below the center of gravity of the inertia member. It is obvious that in this embodiment example the automated restoration from the blocked position into the release position cannot be effected solely due to the gravity of the inertia member. Rather, employing an additional restoring means, for example a spring, is required for this purpose.

Independently of the inertia member being mounted below or above the swing axis, it is in any case advantageous if the clearance, in the release position, is situated between the bearing surface and the swing axis. In contrast to that, it is advantageous if the abutment surface is situated between the bearing surface and the swing axis after the inertia member has been shifted into the blocked position, such that advantageous bearing of the latching engagement means via the bearing surface on the abutment surface in the direction of the swing axis or the swing pivot is effected.

Instead of mounting the inertia member so as to be swivelable, it is equally conceivable to mount the inertia member so as to be displaceable in a linear fashion or within a plane. Here, the requirement is equally obvious that a restoring means is required, which restores the inertia member from the blocked position into the release position. For this purpose, it is advantageous if elastic restoring forces act from at least two, in particular four sides at the inertia member, said restoring forces retaining the inertia member in the release position.

In the following figures, an advantageous embodiment example for an arm rest in accordance with the invention is sketched, wherein the sketches only illustrate the relevant area regarding the mounting of the arm support at the console part, having the latching and the inertia member.

DETAILED DESCRIPTION OF THE EXAMPLE EMBODIMENTS

Figure 1:
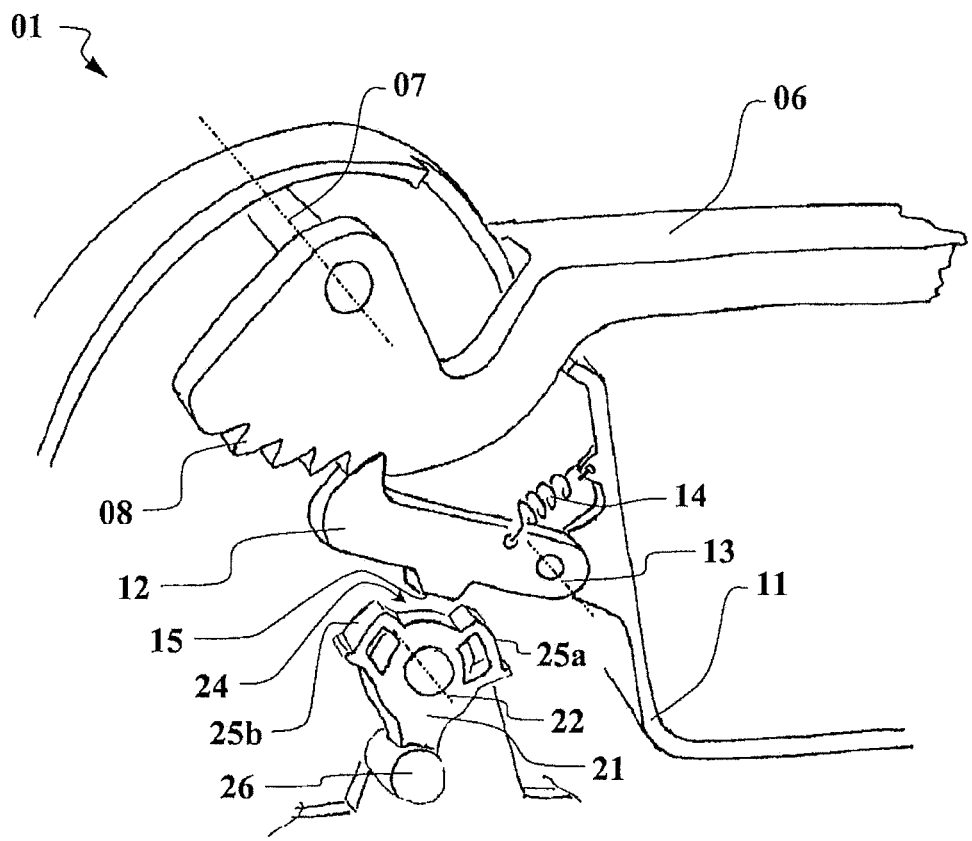
FIG. 1 shows an embodiment example for an arm rest in accordance with the invention in the use position, with the inertia member in the release position.

In FIG. 1, an exemplary embodiment example of an arm rest 01 in accordance with the invention is sketched. Here, the illustration of all areas that are not relevant for the invention has been omitted. In this respect, only the contemplated area having the latching and the inertia member 21 is illustrated. On the one side, the console part 11 can be seen, which—no matter what type it is—is attached in the vehicle. The arm support 06 is mounted at the console part 11 at the swivel axis 07 so as to be swivelable. The use position of the arm support 06, into which said arm support has been swiveled down, is illustrated. In this embodiment example, the arm support 06 includes latching teeth 08, which allow for further intermediate positions apart from the use position, into which said arm support has been swiveled down. A latching engagement means 12 engages the latching teeth 08, said means, for one thing, allowing for swiveling up the arm support 06 without hindrance, and for another preventing swiveling down out of the lower use position as well as out of one of the intermediate positions. For this purpose, the latching engagement means 12 is mounted so as to be swivelable at an axis of rotation 13 and is pulled into the engaged position by a pull spring 14.

Now, in order to realize the blocked state of the latching engagement means 12, the same first of all includes a bearing surface 15 at the lower side thereof. Opposite to the same, the inertia member 21 is situated below the latching engagement means 12, said inertia member being mounted so as to be swivelable at the swing axis 22. It has to be taken into account that in this embodiment example, the center of gravity of the inertia member 21 is situated below the swing axis 22. Here, a swing weight 26 is added to said member in order to guarantee a corresponding location of the center of gravity. Above the swing axis 22, the inertia member 21 includes a clearance 24, in which the bearing surface 15 of the latching engagement means 12 can immerse without hindrance when the latter is shifted. Correspondingly, the inertia member 21 that is illustrated in FIG. 1 is situated in the release position. Opposite to the same, a first abutment surface 25*a* and a second abutment surface 25*b* are situated on both sides of the clearance 24.

Figure 5:
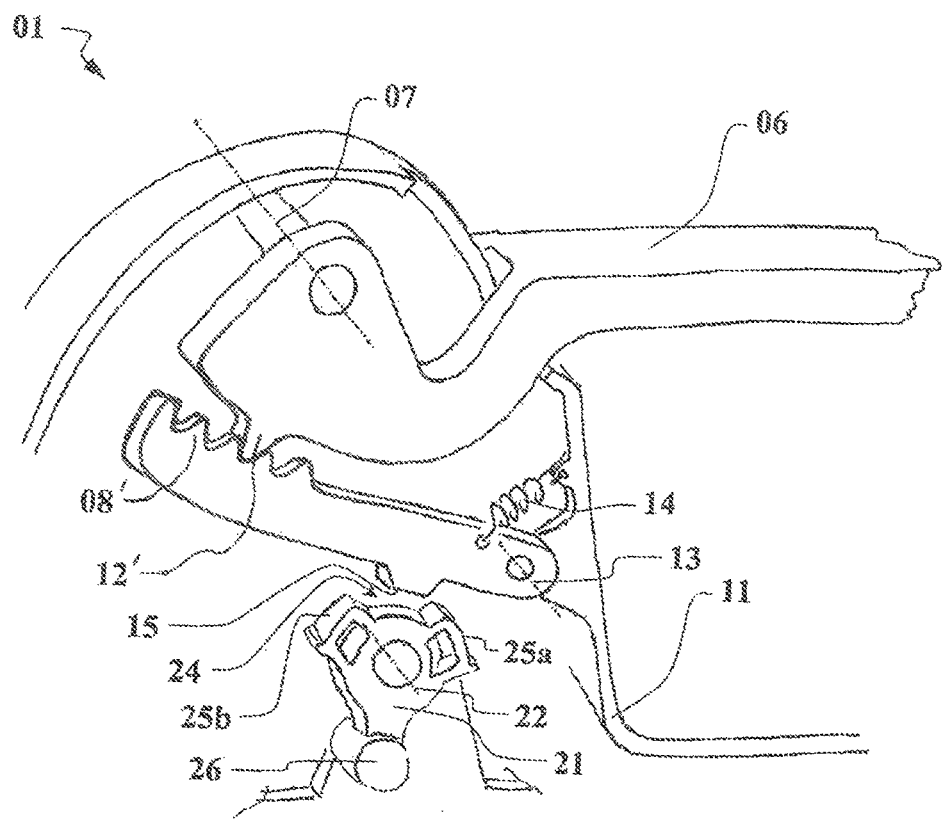
FIG. 5 shows the embodiment of FIG. 1, except with the latching teeth arranged on the console part and the latching engagement member mounted to the arm support.

In an alternative arrangement, as shown in FIG. 5, the latching teeth can be arranged on the console part 11 rather than being arranged on the arm support 06 (see latching teeth 08'). Correspondingly, when the latching teeth 08' are arranged on the console part 11, the latching engagement means is mounted to the arm support 06 rather than the console part 11 (see latching engagement means 12').

Figure 2:
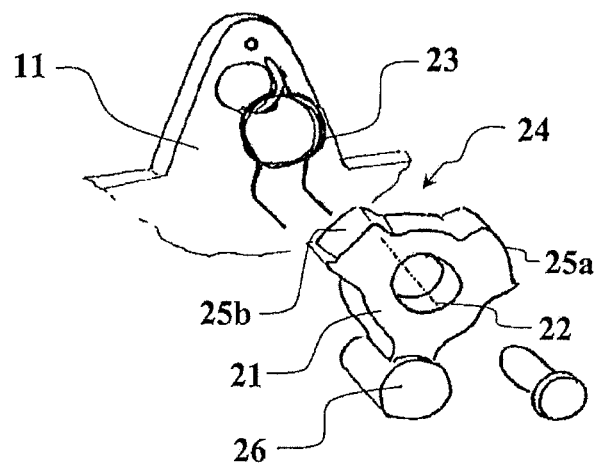
FIG. 2 shows an exploded view for mounting the inertia member.
Figure 3:
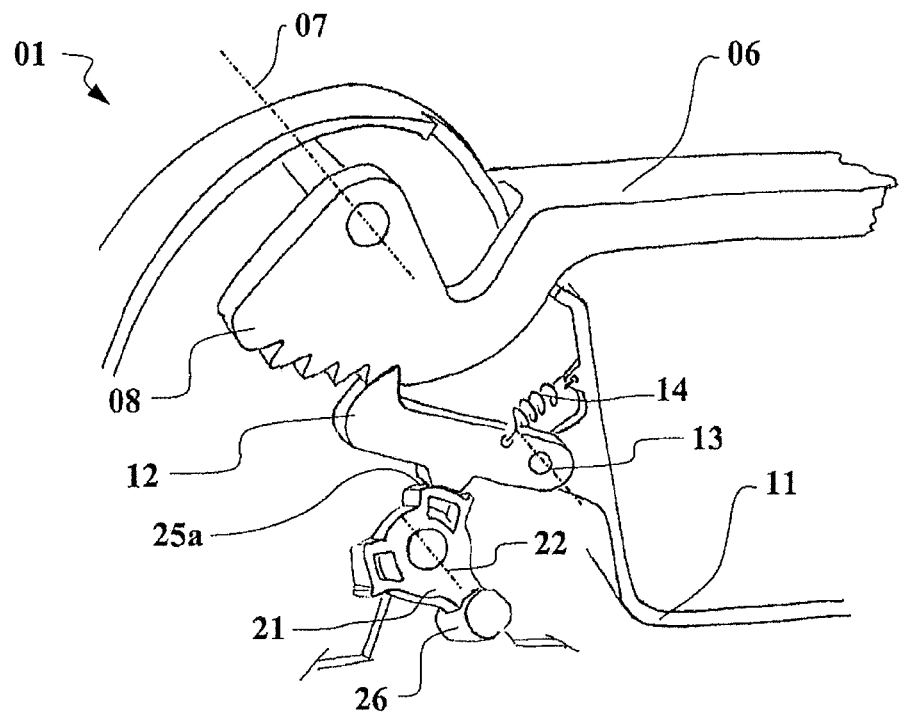
FIG. 3 shows the exemplary arm rest of FIG. 1 with the inertia member in a first blocked position.

As it is sketched in FIG. 2, the inertia member 21 is mounted about the swing axis 22 at the console part 11. The inertia member 21 can already be restored into the release position being illustrated in FIG. 1 already due to the location of the center of gravity of the inertia member 21. Advantageously, safe restoration into the release position is, however, guaranteed by employing a leg spring 23 being effective on both sides.

If the case of a crash now occurs, for example in that the vehicle runs into an obstacle, an acceleration of the arm support 01 that is directed backwards (i.e. deceleration) is effected. In contrast to that, due to the inertia of the inertia member 21 and due to the eccentric arrangement of the center of gravity of the inertia member 21, the same is moved further in the movement direction that existed before, i.e. to the front. This leads to a swivel movement of the inertia member 21 and thus to a shift of the first abutment surface 25*a* into an arrangement beneath the bearing surface 15. Thus, in the following the latching engagement means 12 cannot be swiveled down any more since the bearing surface 15 is now borne on the first abutment surface 25*a*—in an attempt to move the arm rest upwards.

Moreover, in this illustration, it can be seen that the abutment surface 25*a* is situated between the bearing surface 15 and the swing axis 22 of the inertia member 21. Thus, an effective bearing of the latching engagement means 12 at the swing axis 22 of the inertia member 21 is caused.

Figure 4:
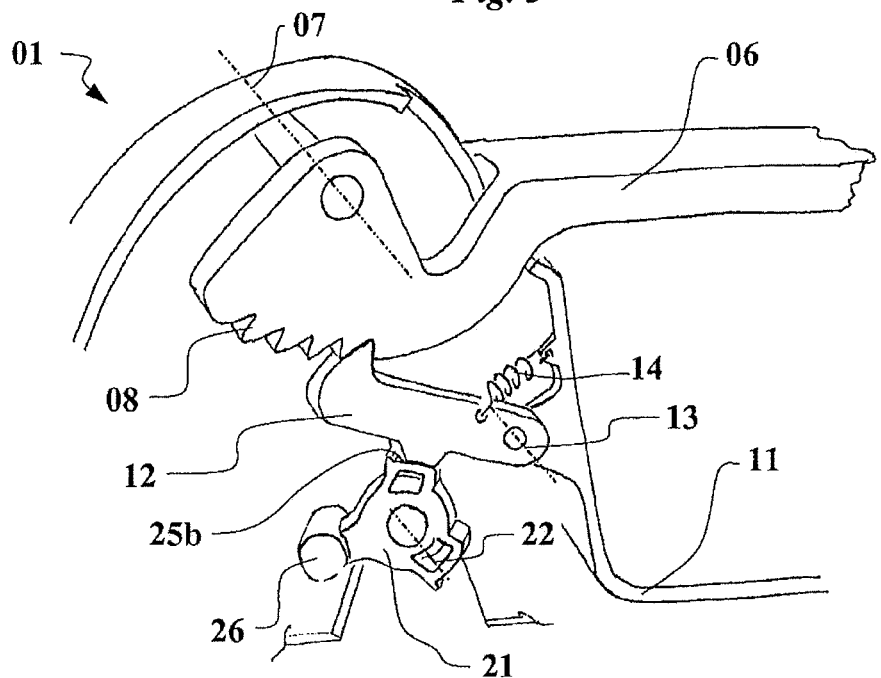
FIG. 4 shows the embodiment example of FIG. 1, with the inertia member in a second blocked position.

In contrast to that, the following FIG. 4 shows the alternative case of a crash, for example in a rear end collision, in which an acceleration that is directed to the front sets in. In contrast to that, due to the inertia of the inertia member 21 and due to the center of gravity thereof that is situated below the swing axis 22, a reverse swivel movement of the inertia member 21 is caused. In line with the previous scenario, this leads to a relocation of the second abutment surface 25*b* beneath the bearing surface 15 of the latching engagement means 12, such that a shift of the latching engagement means 12 is not possible any more, either. This, as in the previous case, effectively leads to preventing an undesired movement of swiveling the arm support 06 up.

The invention claimed is:

1. An arm rest for a vehicle seat, said arm rest comprising:
a console part;
an arm support mounted to the console part so as to be swivelable about a swivel axis between a use position, into which said arm support has been swiveled down, and a rest position, into which said arm support has been swiveled up;
latching teeth fixedly arranged on the console part or on the arm support,
a latching engagement member mounted to the arm support or the console part so as to be shiftable, and which is able to engage the latching teeth in at least one intermediate position when the arm support is swiveled up, out of the use position, and is able to prevent swiveling down of the arm support, and which can be retained in an unlocked status for swiveling the arm support down, from the rest position into the use position;
and an inertia member mounted so as to be shiftable between at least one release position and at least one blocked position, said inertia member, in the at least one blocked position, preventing unlatching of the latching engagement member from a latched status, wherein said inertia member is shifted from the at least one release position into the at least one blocked position upon an acceleration of the arm rest due to the inertia of the inertia member.

2. The arm rest according to claim 1, in which the latching engagement member engages the latching teeth in at least two intermediate positions.

3. The arm rest according to claim 1, in which a shift into the at least one blocked position is effected upon an acceleration in a direction of the swivel axis of the arm support and/or in a direction of a longitudinal axis of the arm support that is situated in the use position.

4. The arm rest according to claim 1, in which the inertia member is mounted so as to be displaceable within a plane.

5. The arm rest according to claim 1, in which from at least two sides at the inertia member, elastic restoring forces act, said elastic forces retaining the inertia member in the at least one release position.

6. The arm rest according to claim 1, in which the latching engagement member engages the latching teeth in multiple intermediate positions.

7. The arm rest according to claim 1, in which the inertia member is mounted in such a manner that a movement from the at least one release position into the at least one blocked position is effected without any deceleration and that a movement from the at least one blocked position into the at least one release position is effected in a decelerated fashion, wherein in particular at least one dampening member engages with the inertia member, which dampening member decelerates the movement into the at least one release position.

8. The arm rest according to claim 1, in which the inertia member, when there is no acceleration, is shifted from the at least one blocked position into the at least one release position in an automated fashion, due to a weight of the inertia member and/or due to an elastic restoring force acting on the inertia member.

9. The arm rest according to claim 8, in which said elastic restoring force is caused by a spring.

10. The arm rest according to claim 1, in which the latching engagement member includes a bearing surface, which, in the at least one release position, is able to immerse into a clearance of the inertia member and, in the at least one blocked position, is able to abut on one of a first abutment surface or a second abutment surface of the inertia member.

11. The arm rest according to claim 10, wherein the first abutment surface is provided on one side of the clearance and the second abutment surface is provided on another side of the clearance.

12. The arm rest according to claim 10, wherein the bearing surface, the first abutment surface and the second abutment surface are shaped in such a manner that the inertia member is prevented from being restored into the at least one release position out of the at least one blocked position when the bearing surface abuts upon one of the first abutment surface or the second abutment surface.

13. The arm rest according to claim 10, in which the inertia member is mounted so as to be swivelable about a swing axis or about a swing pivot, wherein the center of gravity of the inertia member is situated below the swing axis or below the swing pivot.

14. The arm rest according to claim 13, in which in the at least one release position, the clearance is situated between the bearing surface and the swing axis or the swing pivot, and in the at least one blocked position, one of the first abutment surface or the second abutment surface is situated between the bearing surface and the swing axis or the swing pivot.

15. An arm rest for a vehicle seat, said arm rest comprising:
  a console part;
  an arm support mounted to the console part so as to be swivelable about a swivel axis between a use position, into which said arm support has been swiveled down, and a rest position, into which said arm support has been swiveled up;
  latching teeth fixedly arranged on the console part or on the arm support,
  a latching engagement member mounted to the arm support or to the console part so as to be shiftable, and which is able to engage the latching teeth in at least one intermediate position when the arm support is swiveled up, out of the use position, and is able to prevent swiveling down of the arm support, and which can be retained in an unlocked status for swiveling the arm support down, from the rest position into the use position;
  and an inertia member mounted so as to be shiftable between at least one release position and at least one blocked position, said inertia member, in the at least one blocked position, preventing unlatching of the latching engagement member from a latched status, wherein said inertia member is shifted from the at least one release position into the at least one blocked position upon an acceleration of the arm rest due to the inertia of the inertia member,
  wherein the inertia member has two protrusions that protrude from an upper portion of the inertia member, each of the two protrusions having an abutment surface and wherein the two protrusions are spaced apart from one another such that a recessed space is provided between the two protrusions, the recessed space forming a clearance of the inertia member, and
  wherein the latching engagement member has a protrusion that protrudes from a lower portion of the latching engagement member that faces the inertia member, the protrusion of the latching engagement member having a bearing surface, which, in the at least one release position, is able to immerse into the clearance of the inertia member and, in the at least one blocked position, is able to abut on one of the abutment surfaces of the two protrusions.

16. The arm rest according to claim 15, wherein the inertia member and the two protrusions that protrude therefrom form a single, monolithic member.

17. The arm rest according to claim 15, wherein the bearing surface of the latching engagement member abuts on the abutment surface of a first one of the two protrusions of the inertia member during a rear-end collision of a vehicle in which the arm rest is provided and wherein the bearing surface of the latching engagement member abuts on the abutment surface of a second one of the two protrusions of the inertia member during a front-end collision of the vehicle.

* * * * *